A. B. DISS.
SUPPORT FOR TUBULAR LEGS OF FURNITURE.
APPLICATION FILED AUG. 11, 1913.
1,180,829.
Patented Apr. 25, 1916.
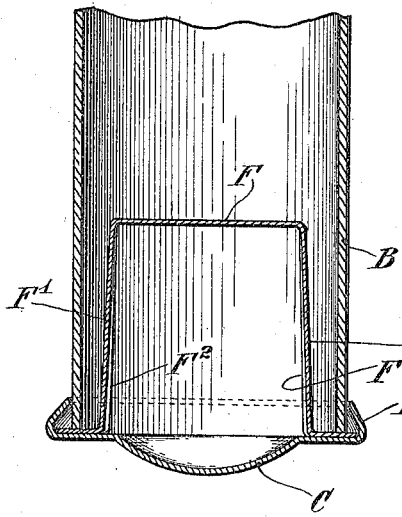
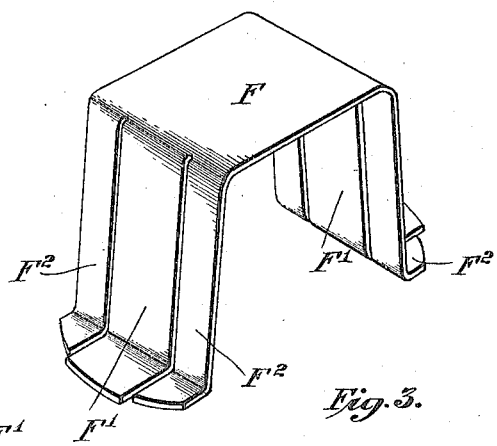
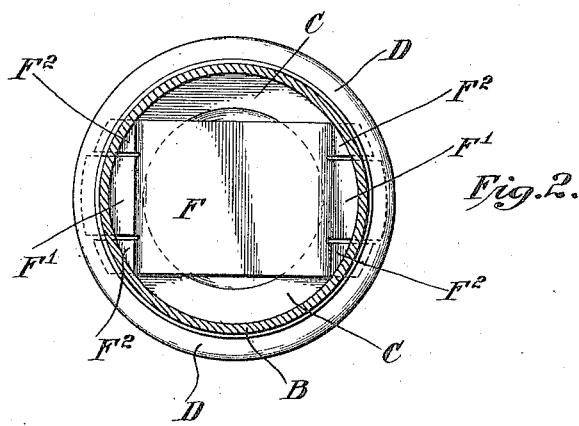
Witnesses:
Inventor
Albert B. Diss
By his Attorneys
Benney & Mastick.

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

SUPPORT FOR TUBULAR LEGS OF FURNITURE.

1,180,829.  Specification of Letters Patent.  Patented Apr. 25, 1916.

Application filed August 11, 1913. Serial No. 784,104.

*To all whom it may concern:*

Be it known that I, ALBERT B. DISS, a resident of Newark, New Jersey, have invented certain new and useful Improvements in Supports for Tubular Legs of Furniture, of which the following is a specification, accompanied by drawings.

The invention relates to sliding or other supports provided with spring holders for securing them to the tubular legs of bedsteads and other furniture, either for temporary use in showrooms or elsewhere, or for more permanent use if desired, and it relates more particularly to such supports when provided with collars or flanges surrounding the ends of the legs.

The object of the invention is to provide such a support with a very simple and very inexpensive form of spring holder having means for directly securing it to the flange and means for securing it to the leg by spring friction on the interior of the leg.

In the accompanying drawings, Figure 1 shows in vertical section a portion of a leg and the support therefor provided with the preferred form of my improvement; Fig. 2 is a view looking down upon the same, showing the leg in section; Fig. 3 shows the spring holder thereof detached.

In the figures, a portion of a tubular leg is shown at B.

The support shown comprises the plate C of circular form and size to cover the foot of the leg and bulged downward to slide easily over carpets and other surfaces, and provided with an upturned and inturned flange D substantially fitting the exterior of the leg and centering the support on the leg and also forming a leg mount or leg ornament. This support is provided with a spring holder F, which is of inverted U-shape with out-turned ends, as in Fig. 3. The top plate or upper horizontal member thereof fits freely within the interior of the tubular leg, and the arms or upright side members $F'$, $F^2$, are turned outward at their lower ends as shown, forming toes which fit beneath and engage with the flange D of the support and are thereby secured to it. These upright members of the spring holder are preferably, though not necessarily, subdivided or slotted, as shown in Fig. 3, so as to form a central arm $F'$ and two lateral spring arms $F^2$, proportioned to be compressed in entering the leg, as usual in spring holders. The outer edges of the outer arms $F^2$ press strongly against the interior of the tubular leg and retain the device by friction. The middle arms $F'$ on each side are out of contact with the interior of the tubular leg, and their lower ends preferably press outward somewhat against the flange D.

In assembling, the spring arms are compressed sufficiently to insert their lower ends in their places in the flange D and then allowed to spring outward into place.

It will be seen from the foregoing that a very simple and effective spring holder is provided, in which in the best form as shown some of the downturned arms act on the interior of the leg, while others, the inner ones mainly, serve to hold the holder to the flange.

I claim the following:

1. A support for tubular legs, comprising leg-supporting means provided with an upwardly and inwardly turned peripheral flange adapted to fit around the foot of the leg, to center said supporting means, and a spring holder, parts of which resiliently engage the interior of the leg, and parts of which spring beneath the foot of the leg and press against the upwardly-turned portion, and below the inturned portion, of said flange, to hold the supporting means to the leg.

2. A support for tubular legs, comprising leg supporting means having a flange adapted to surround the leg and a spring holder of inverted U-shape adapted to fit within the leg, the downturned members of the holder being divided by vertical slots into inner and outer arms, the outer edges of the outer arms pressing against the interior of the leg to frictionally secure the holder thereto, and the inner arms having outturned ends extending out beneath the leg end and engaging within the said flange and thereby securing the spring holder and flange together.

In testimony whereof I have signed this specification in the presence of two subscribing witnesses this 7th day of August, 1913.

ALBERT B. DISS.

Witnesses:
 HAROLD BINNEY,
 A. PSCHIERER.

Copies of this patent may be obtained for five cents each, by addressing the "Commissioner of Patents, Washington, D. C."